United States Patent
Kister et al.

(10) Patent No.: US 8,077,850 B2
(45) Date of Patent: Dec. 13, 2011

(54) CUSTOMIZING CALLED NUMBER IDENTIFICATION

(75) Inventors: Thomas F. Kister, Chalfont, PA (US); Alexander N. Kokhanyuk, Hoschton, GA (US)

(73) Assignee: General Instrument Corporation, Horsham, PA (US)

( * ) Notice: Subject to any disclaimer, the term of this patent is extended or adjusted under 35 U.S.C. 154(b) by 1174 days.

(21) Appl. No.: 11/782,993

(22) Filed: Jul. 25, 2007

(65) Prior Publication Data

US 2009/0028307 A1   Jan. 29, 2009

(51) Int. Cl.
*H04M 3/42* (2006.01)

(52) U.S. Cl. .......... 379/201.01; 379/201.04; 379/211.03

(58) Field of Classification Search ............. 379/201.01, 379/201.04, 211.03
See application file for complete search history.

(56) References Cited

U.S. PATENT DOCUMENTS

| | | | |
|---|---|---|---|
| 5,537,470 A * | 7/1996 | Lee | 379/265.11 |
| 2007/0232342 A1 * | 10/2007 | Larocca | 455/518 |
| 2008/0261529 A1 * | 10/2008 | Rosenblatt | 455/41.3 |
| 2009/0022143 A1 * | 1/2009 | Cassanova | 370/352 |

* cited by examiner

*Primary Examiner* — Creighton Smith

(57) ABSTRACT

Described herein are systems and methods that enable users to configure, customize, or personalize names for called number identification information. Accordingly, when such information is displayed for an incoming phone call, a user is able to quickly determine which line is being called based on a better user-created description of the CNI information.

11 Claims, 4 Drawing Sheets

CUSTOMIZING CALLED NUMBER IDENTIFICATION

BACKGROUND

Traditionally, digital set top boxes (STBs) have been widely available for providing viewers with television programming services, such as cable and satellite television services. Recent advent of voice-over-internet-protocol (VoIP) telephony services, internet-protocol television (IPTV) services, and the push for convergence of digital technologies also have given rise to new integrated STBs that are capable of providing consumers with both video programming and telephone services. For example, some existing integrated STBs can provide users with both telephony and television services and the ability to receive and display caller identification (CID or caller ID) on a television or the like. Thus, such integrated STBs also serve as call-notification receivers. As referred herein, CID or caller ID information identifies the telephone number of the caller or calling party and in some instances the caller's name.

With the proliferation of personal and commercial communication in the present digital information age, there are many businesses and homes that have multiple phone lines to accommodate multiple voice (e.g., telephone) and data (e.g., fax, Internet) communication lines. As referred herein, multiple phone lines indicate multiple different available phone numbers to receive simultaneous communication through all such phone lines. Thus, there are available multi-line phones that allow users to communicate, by voice or data, through multiple available phone lines. However, called number identification (CNI) information is typically hard coded for display by existing multi-line phones to provide generic information, such as "Line 1," "Line 2," "Line 3," etc., to provide generic information that identifies the telephone number of the called party. As referred herein, CNI information identifies the telephone number of the called party. The aforementioned generic CNI information also typically depends on how the phone lines are connected to a particular multi-line phone. For example, a multi-line phone may have two RJ11 inputs with the first one pre-designated as "Line 1" and the second one pre-designated as "Line 2." Thus, any phone line that is connected to the first RJ11 input will be considered "Line 1" and to the second RJ11 input will be considered "Line 2."

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

STBs make available television programming (including media such as audio, video, and/or multimedia) events to viewers. With additional capabilities of the aforementioned integrated STBs, there are numerous possibilities whereby such a STB may serve as a call-notification receiver to receive and display both CID and CNI information to the viewers during a television showing or whenever the television (or any other suitable display device connected to the SB) is on. In a location, such as a business office or a home, that has multiple phone lines in use, the STB is operable to route through the multiple phone lines to provide different communication channels for the users. Again, the CNI information for the multiple available phone lines in use at a location is typically hard coded with generic information, such as "Line 1," "Line 2," "Line 3," etc., for display by an STB. Thus, there is no user-friendly identification of each available phone line. For example, in a home that has four phone lines with Line 1 set up for the home office, Line 2 set up for the home phone, Line 3 set up for a fax machine, and Line 4 set up for the guest room, the generic information "Line X," where X=1-4, does not provide a user with any information as to the purpose or location for each of the phone lines unless the user has committed to memorizing what each phone line represents.

Accordingly, described herein are systems and methods that enable users to configure, customize, or personalize names for CNI information so that when such information is displayed for an incoming phone call, a user is able to quickly determine which line is being called.

System

Figure 1A:
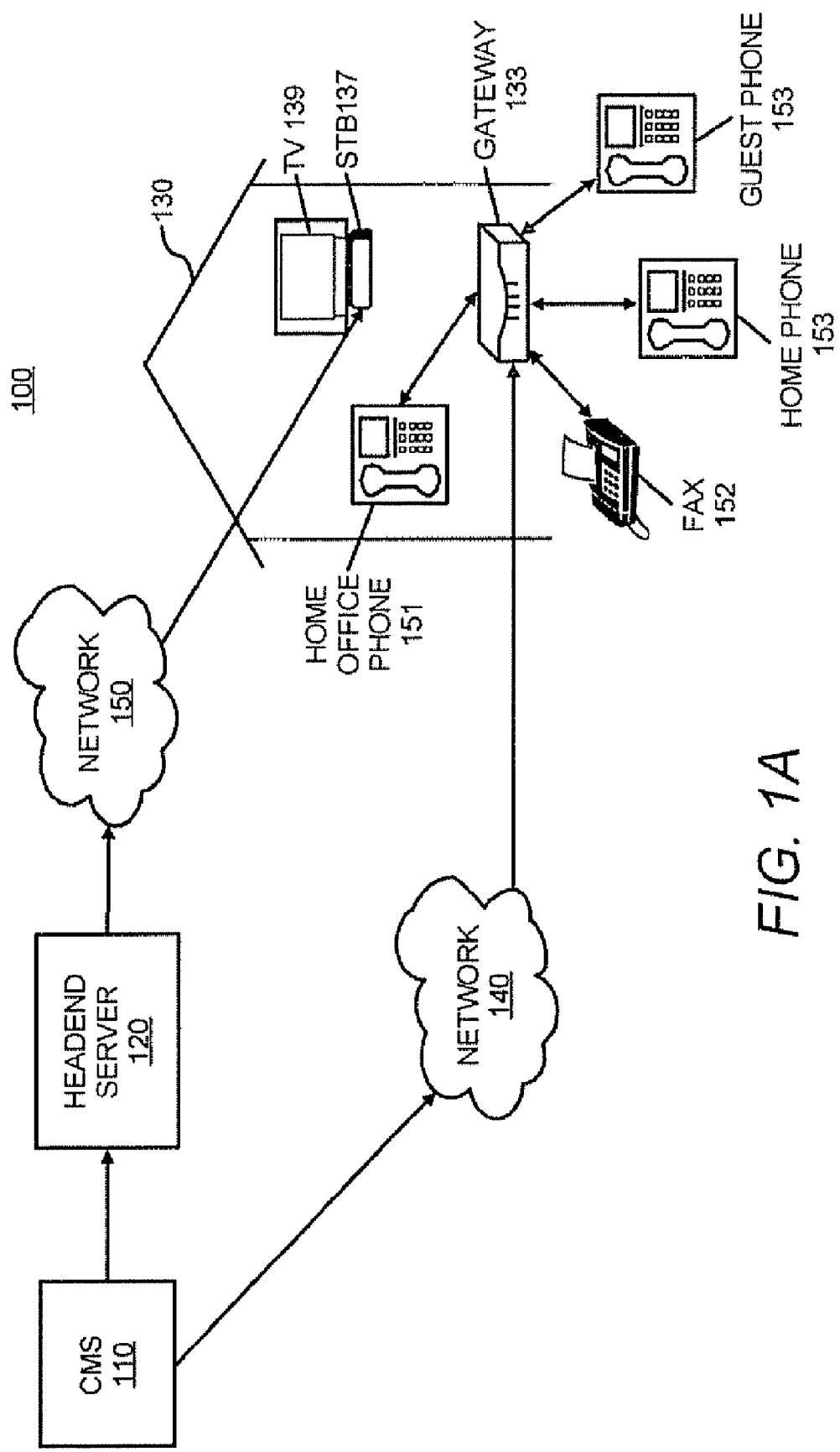
FIG. 1A illustrates an example of a system for providing television programming and telephone services to set top boxes (STBs) at remote user locations.

FIG. 1A illustrates an example of a system 100 for providing television programming and telephone services to STBs at remote user locations. The system 100 includes a call management server (CMS) 110 hosted by a telephone service provider, a headend server 120 hosted by a television programming service provider (e.g., a cable television service provider or a satellite service provider), and one or more STBs 137 located at a user location 130 (e.g., home, residence, lodging unit, or any other customer's premise) and remotely from the headend server 120 and the CMS 110. The telephone service provider may be a VoIP telephone service provider or a plain old telephone service (POTS) provider.

The CMS 110 is operable to provide POTS or VoIP telephone service to the user location 130 via a network 140. The telephone service includes multiple phone lines provided through a gateway device 133 for different communication devices, such as a phone 151 designated for use in a home office, a fax machine 152, a phone 152 designated for use as a home phone, and a phone 154 designated for use in a guest bedroom. In a first scenario wherein the provided telephone service is a VoIP service, the network 140 may be an Internet Protocol (IP) network, such as the public Internet or a private dedicated IP network provided by the telephone service provider. The user location 130 further includes one or more VoIP gateway device to which the communication devices 151-154 may be connected to receive the VoIP service. FIG. 1A illustrates the communication devices 151-154 being connected to a gateway device 133 that is a VoIP gateway device. However, it should be understood that each of the communication devices 151-154 may be connected to its own VoIP gateway device. Each VoIP gateway device 133 may be an embedded multimedia terminal adapter (E-MTA) or may include a separate standalone multimedia terminal adapter (S-MTA) that is in communication with the network 140 via a modem to enable the telephone 135 connected thereto to receive the VoIP service. In a second scenario wherein the provided telephone service is a POTS, the network 140 may be a conventional public switched telephone network (PSTN). Thus, the gateway device 133 may be a typical communication box, often called an entrance bridge, at the user location 130 (e.g., a communication box on the side of the home) that runs a phone line to each of the communication devices 151-154.

The headend server 120 is operable to capture the user's subscription to the television programming service and provide the same to the user location 130 via a network 150, such as a hybrid fiber-coaxial (HFC) network for a cable television service, an IP network like the Internet for an IPTV service, or a terrestrial network for a satellite television service. The headend server 120 is also operable to capture the user's subscription to the telephone service by registering each STB 137 at the user location 130 and correlating such STB(s) with one or more phone lines used by the communication devices 151-155 at the user location 130. To that effect, the headend server 120 may include therein a calling information server to receive from the CMS 110 CID and CNI information of telephone calls incoming through multiple phone lines to the user location 130 and to pass on such call information to the STB 137. The telephone calls may be through POTS or VoIP, depending on the telephone service provider that hosts the CMS 110.

The headend server 120 also includes one or more software applications that are accessible to the user for configuring, customizing, or personalizing desired names for the CNI information. For example, in accordance with the connections of the communication devices 151-154 to the available multiple phone lines, the user may access the headend server 120 to map a phone line connection to the communication device 151 as a user-created customized name "Home Office Phone," a phone line connection to the communication device 152 as a user-created customized name "Fax Machine," a phone line connection to the communication device 153 as a user-created customized name "Home Phone," and a phone line connection to the communication device 154 as a user-created customized name "Guest Phone." The mapping may be stored at the headend server 120 as a look-up table. In an alternative embodiment, the mapping software applications may be in, for example, another server different from the headend server 120. This server is then accessible to the user as described above for the headend server.

In one example, the headend server 120 forwards the look-up table to each STB 137 at the user location 130. The user may access the headend server 120 via a network, such as an IP network, with a user interface, such as a Web browser. Thus, in the first scenario for VoIP telephone service wherein the network 140 is an IP network, the user may also access the headend server 120 via the network 140. The aforementioned user interface, such as the Web browser, may establish a secure session with the headend server 120 using the user's identity and password prior to allowing the user to access the headend server 120. Based on an authentication of the user via the user's identity and password, the headend server 120 is able to identify the available multiple phone lines at the user location 130.

Figure 1B:
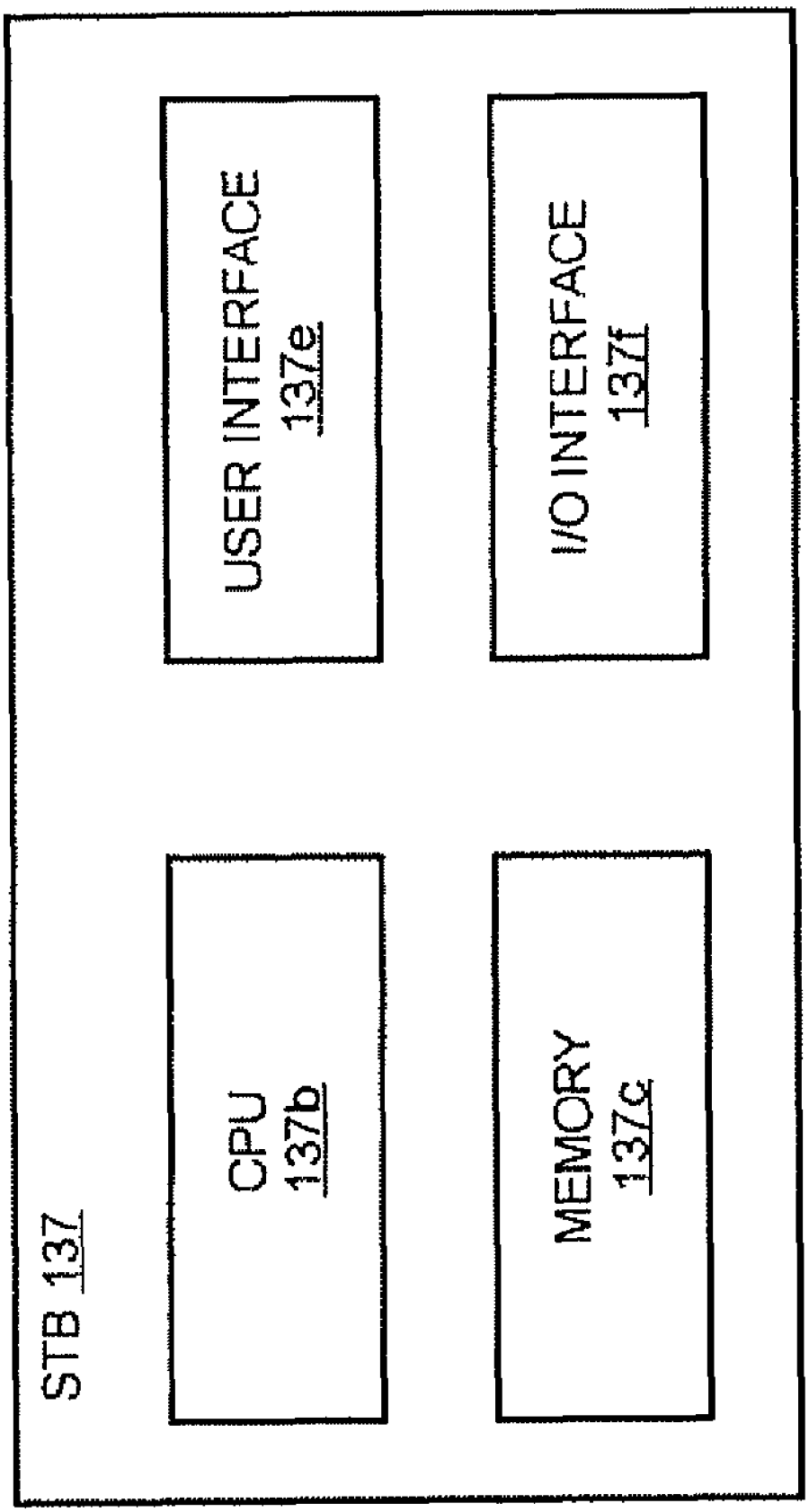
FIG. 1B illustrates a STB that may be used in the system illustrated in FIG. 1A.

FIG. 1B illustrates an STB 137 that may be used in the system 100 illustrated in FIG. 1A. Each STB 137 is shown as a receiver having, among other components, a central processing unit (CPU) 137b, a memory 137c, a user interface 137e, and an I/O interface 137f. A communication bus (not shown) may be implemented to provide connection between the aforementioned components and other components in the STB 137 in a known manner. The STB 137 may be implemented using any known hardware and software (including firmware).

The memory 137c may be implemented as a computer readable medium (CRM) having stored thereon software applications, programs, or modules. These software applications include computer executable instructions that provide any number of functions and operations of the STB 137. The memory 137c is also operable to store the look-up table for mapping CNI information to user-created customized names. The computer-executable program instructions include code from any suitable computer-programming language, such as C, C++, C#, Java, or the like. Examples of a CRM include but are not limited to an electronic, optical, magnetic, or other storage or transmission device capable of providing a processor, such as the CPU 137b, with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable to read instructions.

In one example, the software applications stored in the memory 137c enable the STB 137 to receive and display programming events (e.g., media events such as network television broadcasts, PPVs, VODs) and CID and CNI information of incoming phone calls to the user location 130. The display of the information received by the STB 137 is made possible with a display device, such as the television 139, that is connected to the STB 137. The software applications in the memory 137c also indexes the CNI information for each incoming phone call through on of the multiple phone lines to the user location 130 against the look-up table stored in the memory 137c. This indexing provides a mapping of the received CNI information to user-created customized names. As noted earlier, the CID and CNI information is sent to the STB 137 from a calling information server at the headend server 120. Consequently, the STB 137 is able to display the corresponding user-created customized names in place of the received CNI information to provide the user with a more meaningful description of the CNI information that identifies the destination of the incoming phone call.

A common characteristic of the aforementioned STB functions and operations is that it is desirable to protect these functions from unauthorized access through implementation of a security function, which receives and processes security policy data from the headend server 120 to enable the receiver function 137a in any known manner. Thus, the software applications in the memory 137c may implement such a security function (possibly in conjunction with additional hardware not shown) for the STB 137 as well.

The CPU 137b in the STB 137 includes one or more processors of any of a number of computer processors, such as processors from Intel, AMD, or Cyrix. Each processor is coupled to or includes at least one memory device, such as a computer readable medium (CRM). The processor is operable to execute computer-executable program instructions in software applications stored in a CRM, such as the aforementioned software applications stored in the memory 137c of the STB 137.

The user interface 137e allows a user to enter commands or modify parameters for any of the aforementioned functions or operations that are available to the STB 137 using a conventional interface device, such as a hand-held remote control or a keyboard. For example, the user interface 137e may include an infra-red (IR) or radio-frequency (RF) receiver to receive user commands entered from a hand-held remote control. In another example, the user interface 137e may include a wired or wireless keyboard port to allow the user to connect a keyboard to the STB 137 to enter commands or instructions to the STB 137. An appropriate graphical user interface (GUI) may be provided on a display, such as a television 139, via a display adapter (not shown) for this purpose.

The Input/Output (I/O) interface 137f enables the STB 137 to communicate with the headend server 120 in a known manner, depending on the type of the network 150. For example, if the network 150 is a HFC network, the I/O interface 137f may include modem capabilities for modulating and demodulating signals. In another example, a modem (not shown) may be separately provided, in which case, the I/O interface 137f allows the STB 137 to communication with such a modem to send and receive signals.

Process

Figure 2:
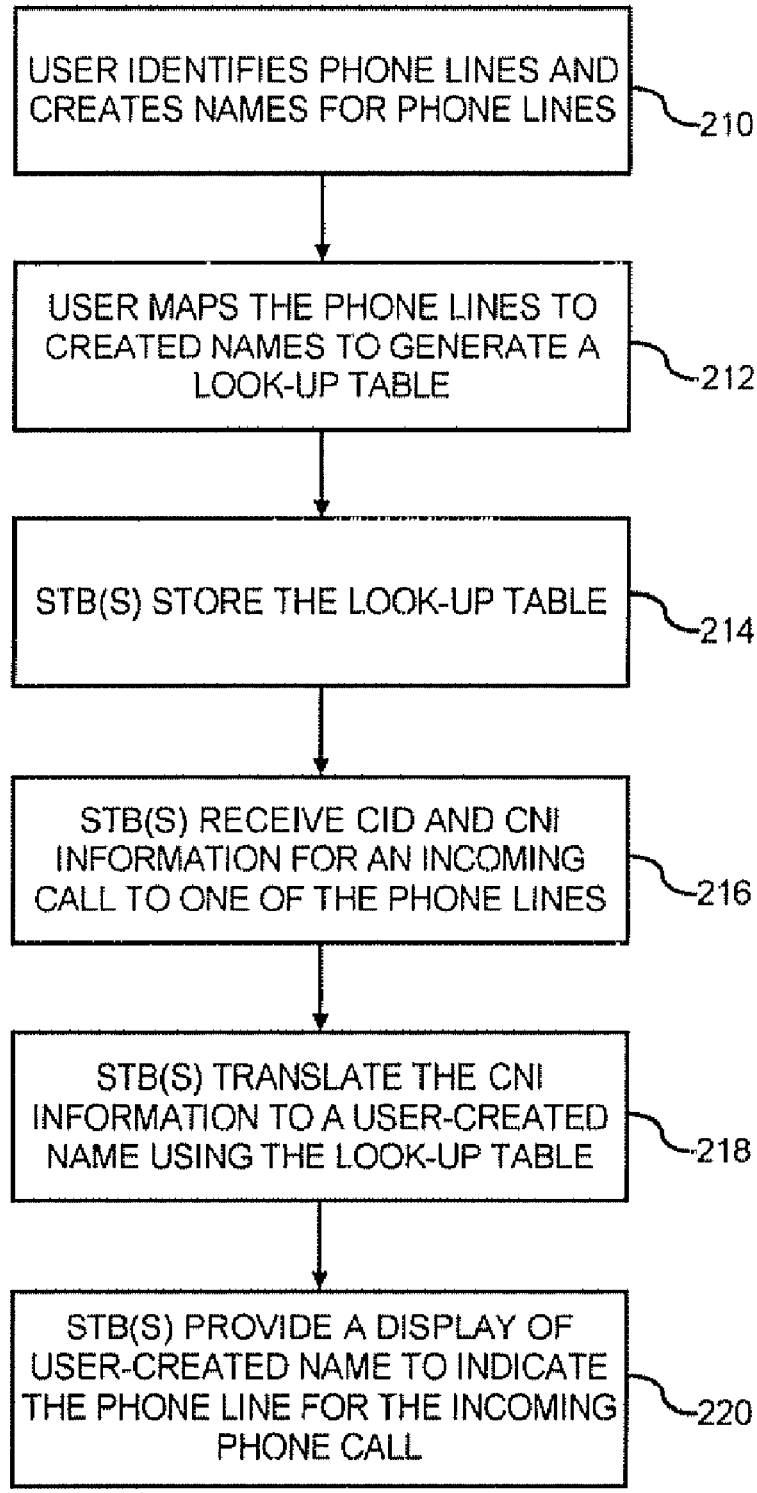
FIG. 2 illustrates a method for mapping called number identification (CNI) information of incoming phone calls to user-created customized names to provide users with a more meaningful description of the CNI information.

FIG. 2 illustrates a process or method 200 for mapping CNI information of incoming phone calls to user-created customized names to provide users with a more meaningful description of the CNI information. For illustrative purposes only and not to be limiting thereof, the method 200 is discussed in the context of the system 100 in FIGS. 1A-B.

At 210, a user identifies the number of phone lines that are provided to the user location 130 and creates a customized name for each of the phone lines as desired. The name selection for each phone line may be based on a desired purpose of the phone line. For example, the user identifies 4 phone lines available at the user location 130 with the following phone numbers: (215) 555-1151, 1152, 153, and 154 for the four communication devices 151-154, respectively. The user then selects "Home Office Phone," "Fax," "Home Phone," and "Guest Phone" for the four phone lines, respectively, based on their connections to the various communication devices and purposes thereof.

At 212, the user maps each of the identified phone lines to each of the user-created names to generate a look-up table. In a first scenario, the user performs the mapping by using a user interface, such as a web browser, to access a software application in the headend server 120 via a data network, such as an IP network like the Internet. As noted earlier, a secure session between the user and the headend server 120 may be established, through input of the user's identity and password, before the user is allowed to access the headend server 120. The provided user's identity and password also enable the headend server 120 to identify the multiple phone lines in use that are associated with the user location 130. In response, the aforementioned software application may prompt the user to enter the user-created customized names and map the phone lines as identified based on the user's identity and password to each of the user-created customized names. It should be understood that the phone lines identified by the headend server 120 are the same phone lines identified by the user for the user location 130. The headend server 120 then generates a look-up table for the mapping. The look-up table is stored as a file in a database of the headend server 120. For example, the user uses a Web browser to access a designated Web site of the headend server 120. After a successful login with entries of the user's identity and password, the user is presented with a screen to enter the phone numbers of each of the four phone lines available at the user location 130 and a user-created customized name for mapping each of the phone number. The headend server 120 then saves the user inputs as a look-up table in a file stored in a database of the headend server 120.

The headend server 120 also forwards a copy of the file to each STB 137 at the user location 130.

In a second scenario, the user performs the mapping by accessing each STB 137 separately and providing the user-created customized names for the identified phone lines in use at the user location 130 (as provided by the headend server 120). Thus, in this scenario, the STB 137 maintains the aforementioned mapping software application instead of the headend server 120 so as to create the look-up table. Again, the user may need to establish a secure session with each STB 137 using the user's identity and password prior to accessing the STB 137 and any components therein.

At 214, each STB 137 stores the look-up table file. In the aforementioned first scenario wherein the head-end server 120 creates the look-up table, the headend server 120 may then forward the look-up table file to each STB 137 for storage. In the aforementioned second scenario wherein the look-up table is created by each STB 137, the corresponding look-up table file is also saved by each STB 137.

At 216, when a phone call comes through one of the multiple phone lines provided at the user location 130, the headend server 120 (via a calling information server therein) also receives a call notification of the phone call from the CMS 110. The call notification includes CID and CNI information of the phone call. Consequently, each STB 137 receives from the headend server 120 the CID and CNI information of the phone call for display on the television 139 (or any other display device connected thereto). For example, when a phone call comes into the phone line that is connected to the fax machine 152, each STB 137 receives: a) CID information that identifies the source fax machine that initiates the phone call to fax a document, and b) CNI information that identifies the phone number (215) 555-1152 for the fax machine 152.

At 218, each STB 137 translates the received CNI information into a user-created customized name based on the look-up table saved at the STB 137. For example, the STB 137 finds a match of the user-created customized name, "Fax Machine" in the look-up table for the CNI information, (215) 555-1152.

At 220, if the STB 137 is on, it provides a display to the television 139 of the user-created customized name for the CNI information to provide a customized or personalized description of the particular phone line for which the phone call is intended. For example, the STB 137 provides a display of "Phone Call to Fax Machine" on the television 139 when the phone call comes in (e.g., when there is a ringing at the fax machine 152 to indicate an incoming phone call). The STB 137 is also operable to provide a display of the CID information for the incoming phone call.

Figure 3:
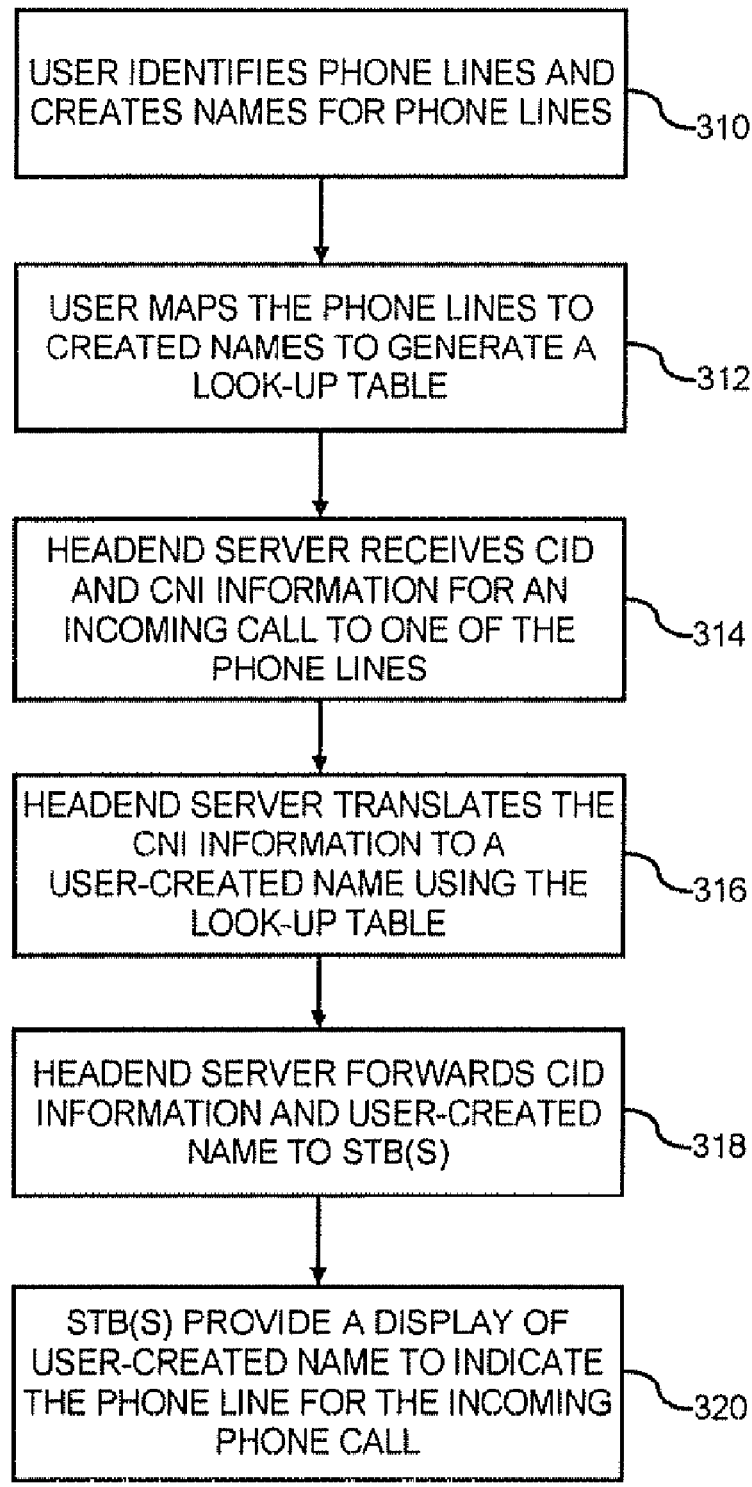
FIG. 3 illustrates another method for mapping called number identification (CNI) information of incoming phone calls to user-created customized names to provide users with a more meaningful description of the CNI information.

FIG. 3 illustrates an alternative process or method 300 for mapping CNI information of incoming phone calls to user-created customized names to provide users with a more meaningful description of the CNI information. Again, for illustrative purposes only and not to be limiting thereof, the method 300 is discussed in the context of the system 100 in FIGS. 1A-B.

At 310, as described above at 210 in FIG. 2, a user identifies the number of phone lines that are provided to the user location 130 and selects a desired name for each of the phone lines.

At 312, as described above for the first scenario at 212 in FIG. 2, the user maps each of the identified phone lines to each of the user-created names to generate a look-up table. That is, the user performs the mapping by using a user interface, such as a web browser, to access a software application in the headend server 120 via a data network, such as an IP network like the Internet. Again, a secure session between the user and the headend server 120 may be established before the user is allowed to access the headend server 120. In response, such a software application prompts the user to enter the user-created names for mapping to the identified phone lines to each of the user-created names. The headend server 120 then saves the mapping as a look-up table for storage as a file in a database of the headend server 120. For this alternative method 300, the look-up table file is not forwarded to each STB 137 at the user location 130 for storage.

At 314, when a phone call comes in one of the multiple phone lines provided at the user location 130, the headend server 120 (via a calling information server therein) also receives CID and CNI information of the phone call from the CMS 110. For example, when a phone call comes into the phone line that is connected to the fax machine 152, the headend server 120 receives CID information that provides information about source fax machine that initiates the phone call to fax a document and CNI information that identifies the phone number (215) 555-1152 for the fax machine 152.

At 316, the headend server 120 proceeds to translate the received CNI information into a user-created name based on the look-up table saved in the headend server 120. Thus, for the alternative method 300, the translation of the CNI information is performed at the headend server 120 and not at the STB 137. For example, the headend server 120 finds a match of the user-created name, "Fax Machine" in the look-up table for the CNI information, (215) 555-1152.

At 318, the headend server 120 transmits or forwards the CID information and the translated CNI information, i.e., the corresponding user-created name, to the STB 137.

At 320, if the STB 137 is on, it provides a display to the television 139 of the received user-created name to provide a customized or personalized description of the particular phone line for which the phone call is intended. For example, the STB 137 provides a display of "Phone Call to Fax Machine" on the television 139 when the phone call comes in (e.g., when there is a ringing at the fax machine 152 to indicate an incoming phone call). The STB 137 is also operable to provide a display of the CID information for the incoming phone call.

In recap, the systems and methods as provided herein enable a user to customize or personalize otherwise generic CNI information of incoming phone calls to multiple phone lines so that the user is able to quickly determine which phone line is being called based on a better user-created description of the CNI information.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for mapping called number identification (CNI) information to user-created customized names comprising:
    identifying a plurality of phone lines in use;
    receiving user-created customized names for the identified plurality of phone lines;
    mapping each of the user-created customized names to each different one of the identified plurality of phone lines;
    generating a look-up table for the mapping;
    receiving a call notification of an incoming phone call through one of the identified plurality of phone lines, the call notification includes CNI information of the one phone line through which the incoming phone call is received;
    translating the CNI information of the incoming phone call to a corresponding one of the user-created customized names from the look-up table; and
    providing a display of the translated CNI information as the corresponding user-created customized name at a call-notification receiver to identify the one phone line through which the incoming phone call is received;
    wherein generating the look-up table comprises generating the look-up table remotely from the call-notification receiver;
    the method further comprising:
        forwarding the look-up table to the call-notification receiver; and
        storing the look-up table at the call-notification receiver.

2. A method of claim 1:
    wherein the call notification further includes caller identification (CID) information of a source that initiates the incoming phone call;
    the method further comprising:
        providing a display of the CID information at the call-notification receiver.

3. The method of claim 1 wherein the call-notification receiver is a set top box that further operates to provide a display of television programs.

4. The method of claim 1 wherein translating the CNI information comprises:
    the call-notification receiver translating the CNI information of the incoming phone to the corresponding user-created customized name from the look-up table as stored at the call-notification receiver.

5. The method of claim 1:
    wherein mapping comprises the call-notification receiver mapping each of the user-created customized names to each different one of the identified plurality of phone lines; and
    wherein generating the look-up table comprises the call-notification receiver generating the look-up table for the mapping.

6. The method of claim 1 wherein identifying the plurality of phone lines comprises:
    authenticating a user with access to the plurality of phone lines in use; and
    identifying the plurality of phone lines in use based on the user authenticating.

7. The method of claim 1:
    wherein translating the CNI information comprises translating, remotely from the call-notification receiver, the CNI information of the incoming phone call to a corresponding one of the user-selected customized names from the look-up table;
    the method further comprising:
        forwarding the corresponding user-selected customized name in place of the CNI information as part of the call notification to the call-notification receiver.

8. A method for mapping called number identification (CNI) information to user-created customized names with a call-notification receiver, the method comprising:
    receiving at the call-notification receiver a list of user-created customized names mapped to a plurality of pre-determined phone lines;
    receiving at the call-notification receiver CNI information of an incoming phone call through one of the predetermined phone lines, the CNI information is provided by a telephone service provider that services one of the predetermined phone lines through which the incoming phone call is received;

the call-notification receiver translating the CNI information of the incoming phone call to a corresponding one of the user-created customized names from the list; and the call-notification receiver providing a display of the corresponding one of the user-created customized names in place of the CNI information as a customized description of the one phone line;

wherein receiving at the call-notification receiver a list of user-created customized names comprises:
   receiving at the call-notification receiver a remote forwarding of the list.

9. The method of claim 8 further comprising:

receiving at the call-notification receiver caller identification (CID) information of the incoming phone call; and the call-notification receiver providing a display of the CID information.

10. The method of claim 8 wherein receiving at the call-notification receiver a list of user-created customized names comprises:
   receiving at the call-notification receiver a user input of the user-created customized names;
   receiving at the call-notification receiver an identification of a plurality of predetermined phone lines; and
   the call-notification receiver mapping the user-created customized names to the plurality of predetermined phone lines to create the list based on the user input.

11. The method of claim 8 wherein the telephone service provider provides one of plain old telephone service and voice over internet protocol telephone service for the one predetermined phone line.

* * * * *